(12) United States Patent
Johns et al.

(10) Patent No.: US 8,171,448 B2
(45) Date of Patent: *May 1, 2012

(54) STRUCTURE FOR A LIVELOCK RESOLUTION CIRCUIT

(75) Inventors: Charles R. Johns, Austin, TX (US); David J. Krolak, Rochester, MN (US); Peichun P. Liu, Austin, TX (US); Alvan W. Ng, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 844 days.

This patent is subject to a terminal disclaimer.

(21) Appl. No.: 12/129,777

(22) Filed: May 30, 2008

(65) Prior Publication Data

US 2008/0228974 A1 Sep. 18, 2008

Related U.S. Application Data

(63) Continuation-in-part of application No. 11/532,987, filed on Sep. 19, 2006, now Pat. No. 7,500,035.

(51) Int. Cl.
*G06F 17/50* (2006.01)
(52) U.S. Cl. ........................ 716/136; 716/106
(58) Field of Classification Search .......... 716/106–109, 716/134; 710/113, 240
See application file for complete search history.

(56) References Cited

U.S. PATENT DOCUMENTS

| | | | |
|---|---|---|---|
| 5,761,446 A | 6/1998 | Donley et al. | |
| 6,073,182 A | 6/2000 | Jones et al. | |
| 6,078,981 A | 6/2000 | Hill et al. | |
| 6,151,655 A | 11/2000 | Jones et al. | |
| 6,523,076 B1 | 2/2003 | Kruse | |
| 7,000,047 B2 | 2/2006 | Nguyen et al. | |
| 7,065,596 B2 * | 6/2006 | Kulick et al. | 710/240 |
| 7,219,178 B2 | 5/2007 | Harris et al. | |
| 7,500,035 B2 * | 3/2009 | Johns et al. | 710/113 |
| 7,558,923 B1 | 7/2009 | Bennett et al. | |
| 2004/0068597 A1 * | 4/2004 | Kulick et al. | 710/240 |
| 2004/0073732 A1 | 4/2004 | Chae | |
| 2004/0215933 A1 | 10/2004 | Nguyen et al. | |
| 2007/0174530 A1 | 7/2007 | Genova et al. | |
| 2007/0245129 A1 | 10/2007 | Abernathy et al. | |
| 2007/0277025 A1 | 11/2007 | Altman et al. | |
| 2008/0065873 A1 | 3/2008 | Hall et al. | |

(Continued)

OTHER PUBLICATIONS

Office Action mailed Apr. 2, 2010 for U.S. Appl. No. 12/393,469.

(Continued)

*Primary Examiner* — Jack Chiang
*Assistant Examiner* — Binh Tat
(74) *Attorney, Agent, or Firm* — Stephen J. Walder, Jr.; Matthew B. Talpis

(57) ABSTRACT

A design structure for a livelock resolution circuit is provided. When a bus unit detects a timeout condition, or potential timeout condition, the bus unit activates a livelock resolution request signal. A livelock resolution unit receives livelock resolution requests from the bus units and signals an attention to a control processor. The control processor performs actions to attempt to resolve the livelock condition. Once a bus unit that issued a livelock resolution request has managed to successfully issue its command, it deactivates its livelock resolution request. If all livelock resolution request signals are deactivated, then the control processor instructs the bus and all bus units to resume normal activity. On the other hand, if the control processor determines that a predetermined amount of time passes without any progress being made, it determines that a hang condition has occurred.

18 Claims, 5 Drawing Sheets

U.S. PATENT DOCUMENTS

2008/0071955 A1 3/2008 Johns et al.
2009/0164682 A1 6/2009 Johns et al.

OTHER PUBLICATIONS

Notice of Allowance mailed Aug. 16, 2010 for U.S. Appl. No. 12/393,469, 6 pages.
Response to Office Action filed with the USPTO on Jul. 2, 2010 for U.S. Appl. No. 12/393,469, 7 pages.
Supplemental Notice of Allowability mailed Nov. 16, 2010 for U.S. Appl. No. 12/393,469, 4 pages.
USPTO U.S. Appl. No. 11/532,987.
USPTO U.S. Appl. No. 12/393,469.

* cited by examiner

STRUCTURE FOR A LIVELOCK RESOLUTION CIRCUIT

BACKGROUND OF THE INVENTION

1. Field of the Invention

The present application relates generally to a design structure and more specifically, to a design structure for a livelock resolution circuit.

2. Background of the Invention

Deadlock is a situation where two or more processes in a data processing system are unable to proceed because each is waiting for one of the others to do something. A common example is a program communicating to a server that may be in a state of waiting for output from the server before sending anything more to the server, while the server is similarly waiting for more input from the controlling program before outputting anything. This particular type of deadlock is sometimes called a "starvation deadlock," although the term "starvation" is more properly used for situations where a program can never run simply because it never gets high enough priority.

A livelock is similar to a deadlock, except that the state of the two processes involved in the livelock constantly changes with regards to the other process. As a real world example, livelock occurs when two people meet in a narrow corridor, and each tries to be polite by moving aside to let the other pass, but they end up swaying from side to side without making any progress because they always both move the same way at the same time. For example, two or more processing elements may be stuck in loops because each processing element repeatedly reaches a point in the loop where it must tell the other to retry a particular command. A livelock can occur, for example, when a process that calls another process is itself called by that process. A livelock may be caused by malicious code or a software or hardware design bug.

A number of solutions in the prior art are concerned with preventing livelocks in a multiprocessor system. However, despite these efforts, combinations of software sequences and the way the hardware executes it may still conspire to create a livelock anyway.

A multiprocessor system typically provides each processing element with a watchdog timer. If a command begins and the watchdog time expires without any progress being made on the command, the processing element may signal that a "hang" has occurred. A hang is a freezing condition where the processor cannot continue execution. In the prior art, a service processor or control processor may signal a checkstop to the processors upon a hang condition, thus stopping the clock.

BRIEF SUMMARY OF THE INVENTION

The illustrative embodiments recognize the disadvantages of the prior art and provide a mechanism for resolving livelock conditions in a multiple processor data processing system. When a bus unit detects a timeout condition, or potential timeout condition, the bus unit activates a livelock resolution request signal. A livelock resolution unit receives livelock resolution requests from the bus units and signals an attention to a control processor. The control processor performs actions to attempt to resolve the livelock condition. For example, the control controller may thermal throttle one or more processing elements, quiesce one or more processing elements, or signal the bus to serialize bus commands.

In one illustrative embodiment, a method for livelock resolution in a data processing system is provided. The processing system comprises a bus, at least one primary processing element, and a plurality of support processing elements. The method comprises responsive to a timeout condition in at least one of a plurality of bus units, generating a livelock resolution request signal and responsive to the livelock resolution request signal, signaling an attention to a control processor. Responsive to the attention, the control processor sets status information to perform one or more actions to attempt to correct a potential livelock condition. The status information comprises a livelock resolution signal. The method further comprises responsive to the control processor setting the livelock resolution signal, quiescing at least a subset of the primary processing element and the plurality of support processing elements.

In one exemplary embodiment, the status information comprises bus mode information. The method further comprises responsive to the control processor setting the bus mode signal to a serialized mode, entering the bus into a serialized mode.

In another exemplary embodiment, quiescing at least a subset of the primary processing element and the plurality of support processing elements comprises throttling the at least one primary processing element.

In a further exemplary embodiment, the plurality of bus units comprise the at least one primary processing element, the plurality of support processing elements, and the bus. In another exemplary embodiment, the plurality of bus units comprises a memory control unit or a peripheral control unit. In a still further embodiment, each bus unit within the plurality of bus units has a watchdog timer, wherein the timeout condition exists when the watchdog timer expires. In yet another exemplary embodiment, each bus unit within the plurality of bus units has a watchdog timer. The timeout condition exists when the watchdog timer is a predetermined percentage away from expiring.

In another exemplary embodiment, generating a livelock resolution request signal comprises receiving livelock resolution request signals from the plurality of bus units and combining the livelock resolution request signals from the plurality of bus units to form a combined livelock resolution request signal. In a further exemplary embodiment, generating a livelock resolution request signal further comprises determining whether the combined livelock resolution request signal is activated for a predetermined amount of time.

In another illustrative embodiment, an apparatus for livelock resolution in a data processing system is provided. The processing system comprises a bus, at least one primary processing element, and a plurality of support processing elements. The apparatus comprises detection logic that detects a livelock condition. The detection logic signals an attention to a control processor responsive to presence of a livelock condition. Responsive to the attention, the control processor sets status information to perform one or more actions to attempt to correct a potential livelock condition. The status information comprises a livelock resolution signal. The apparatus further comprises activation logic that engages quiescing of at least a subset of the primary processing element and the plurality of support processing elements responsive to a livelock resolution signal from the control processor or a throttle signal from the control processor.

In one exemplary embodiment, the status information comprises bus mode information. The apparatus further comprises bus mode logic that engages a serialized bus mode at the bus responsive to the control processor setting the bus mode signal to a serialized mode.

In another exemplary embodiment, quiescing at least a subset of the primary processing element and the plurality of support processing elements comprises throttling the at least one primary processing element.

In other exemplary embodiments, the apparatus performs various ones of the operations outlined above with regard to the method in the illustrative embodiments.

In a further illustrative embodiment, a data processing system comprises a bus, at least one primary processing element connected to the bus, a plurality of secondary processing elements connected to the bus, a livelock resolution unit connected to the bus, and a control processor connected to the livelock resolution unit. Responsive to a livelock condition in at least one of a plurality of bus units, the livelock resolution unit signals an attention to a control processor. Responsive to the attention signaled from the livelock resolution unit, the control processor generates a livelock resolution signal and a serialized bus mode signal. Responsive to the livelock resolution signal from the control processor, the livelock resolution unit throttles the at least one primary processing element and quiesces the plurality of support processing elements.

In one exemplary embodiment, responsive to the attention signaled from the livelock resolution unit, the control processor generates a serialized bus mode signal. Responsive to the serialized bus mode signal, the livelock resolution unit enters the bus into a serialized bus mode.

In another exemplary embodiment, quiescing at least a subset of the primary processing element and the plurality of support processing elements comprises throttling the at least one primary processing element.

In a further exemplary embodiment, the plurality of bus units comprise the at least one primary processing element, the plurality of support processing elements, and the bus.

In another illustrative embodiment, a design structure embodied in a machine readable medium for designing, manufacturing, or testing an integrated circuit is provided. The design structure may be encoded on a machine-readable data storage medium and may comprise elements that, when processed in a computer-aided design system, generates a machine-executable representation of a livelock resolution circuit. The design structure may be a hardware description language (HDL) design structure. The design structure may comprise a netlist and may reside on a storage medium as a data format used for the exchange of layout data of integrated circuits.

In yet another illustrative embodiment, a method in a computer-aided design system for generating a functional design model of a livelock resolution circuit is provided.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE INVENTION

Figure 1:
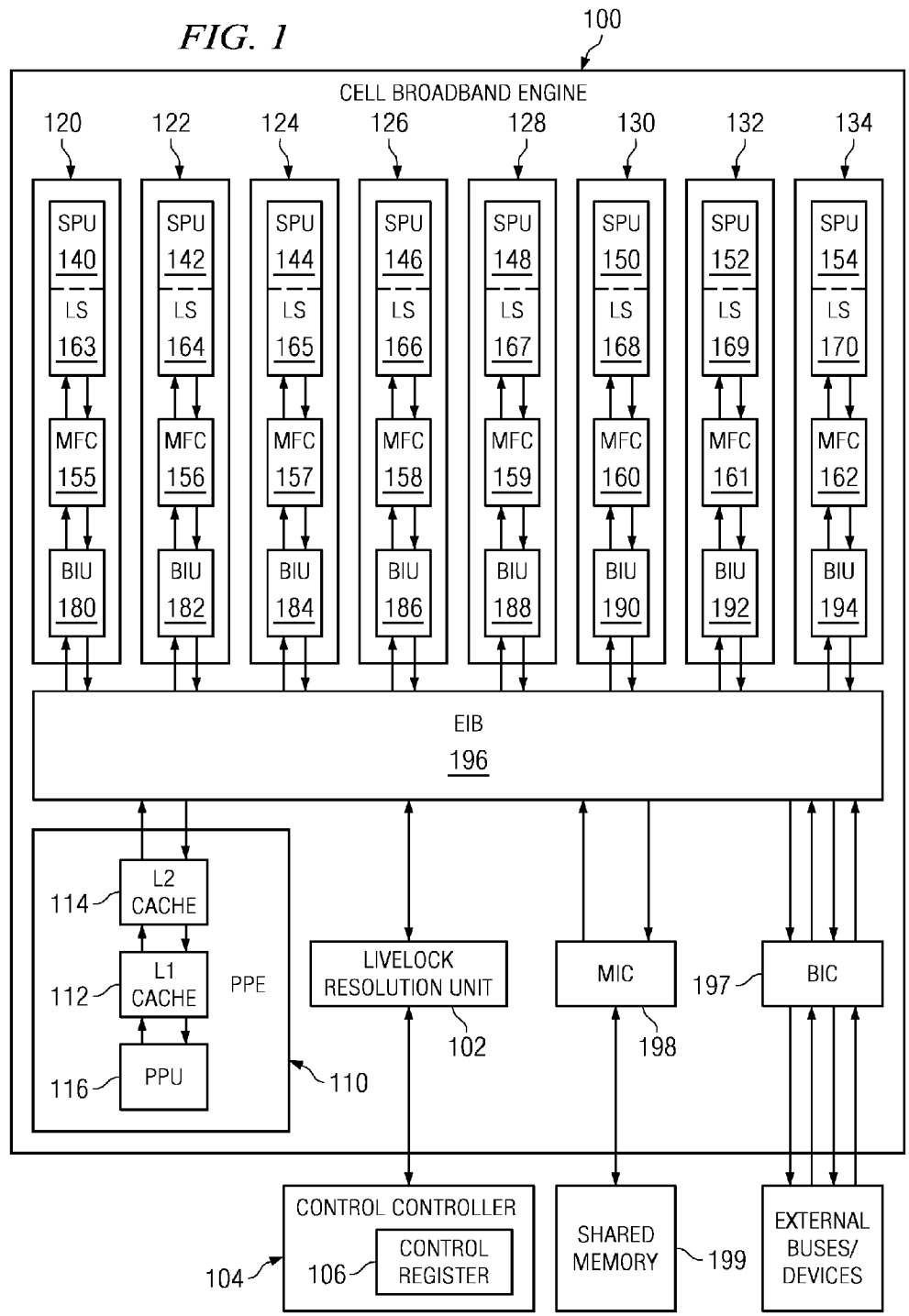
FIG. 1 is an exemplary block diagram of a data processing system in which aspects of the present invention may be implemented.

FIG. 1 is an exemplary block diagram of a data processing system in which aspects of the present invention may be implemented. The exemplary data processing system shown in FIG. 1 is an example of the Cell Broadband Engine (CBE) data processing system. While the CBE will be used in the description of the preferred embodiments of the present invention, the present invention is not limited to such, as will be readily apparent to those of ordinary skill in the art upon reading the following description.

As shown in FIG. 1, the CBE 100 includes a power processor element (PPE) 110 having a processor (PPU) 116 and its L1 and L2 caches 112 and 114, and multiple synergistic processor elements (SPEs) 120-134 that each has its own synergistic processor unit (SPU) 140-154, memory flow control 155-162, local memory or store (LS) 163-170, and bus interface unit (BIU unit) 180-194 which may be, for example, a combination direct memory access (DMA), memory management unit (MMU), and bus interface unit. A high bandwidth internal element interconnect bus (EIB) 196, a bus interface controller (BIC) 197, and a memory interface controller (MIC) 198 are also provided.

The local memory or local store (LS) 163-170 is a non-coherent addressable portion of a large memory map which, physically, may be provided as small memories coupled to the SPUs 140-154. The local stores 163-170 may be mapped to different address spaces. These address regions are continuous in a non-aliased configuration. A local store 163-170 is associated with its corresponding SPU 140-154 and SPE 120-134 by its address location, such as via the SPU Identification Register, described in greater detail hereafter. Any resource in the system has the ability to read/write from/to the local store 163-170 as long as the local store is not placed in a secure mode of operation, in which case only its associated SPU may access the local store 163-170 or a designated secured portion of the local store 163-170.

The CBE 100 may be a system-on-a-chip such that each of the elements depicted in FIG. 1 may be provided on a single microprocessor chip. Moreover, the CBE 100 is a heterogeneous processing environment in which each of the SPUs may receive different instructions from each of the other SPUs in the system. Moreover, the instruction set for the SPUs is different from that of the PPU, e.g., the PPU may execute Reduced Instruction Set Computer (RISC) based instructions while the SPU execute vectorized instructions.

The SPEs 120-134 are coupled to each other and to the L2 cache 114 via the EIB 196. In addition, the SPEs 120-134 are coupled to MIC 198 and BIC 197 via the EIB 196. The MIC 198 provides a communication interface to shared memory 199. The BIC 197 provides a communication interface between the CBE 100 and other external buses and devices.

The PPE 110 may be a dual-threaded processor. The combination of this dual threaded PPE 110 and the eight SPEs 120-134 makes the CBE 100 capable of handling 10 simultaneous threads and over 128 outstanding memory requests. The PPE 110 acts as a controller for the other eight SPEs 120-134 which handle most of the computational workload. The PPE 110 may be used to run conventional operating systems while the SPEs 120-134 perform vectorized floating point code execution, for example.

The SPEs 120-134 comprise a synergistic processing unit (SPU) 140-154, memory flow control units 155-162, local memory or store 163-170, and an interface unit 180-194. The local memory or store 163-170, in one exemplary embodiment, comprises a 256 KB instruction and data memory which is visible to the PPE 110 and can be addressed directly by software.

The PPE 110 may load the SPEs 120-134 with small programs or threads, chaining the SPEs together to handle each step in a complex operation. For example, a set-top box incorporating the CBE 100 may load programs for reading a DVD, video and audio decoding, and display, and the data would be passed off from SPE to SPE until it finally ended up on the output display. At 4 GHz, each SPE 120-134 gives a theoretical 32 GFLOPS of performance with the PPE 110 having a similar level of performance.

The memory flow control units (MFCs) 155-162 serve as an interface for an SPU to the rest of the system and other elements. The MFCs 155-162 provide the primary mechanism for data transfer, protection, and synchronization between main storage and the local storages 163-170. There is logically an MFC for each SPU in a processor. Some implementations can share resources of a single MFC between multiple SPEs. In such a case, all the facilities and commands defined for the MFC must appear independent to software for each SPU. The effects of sharing an MFC are limited to implementation-dependent facilities and commands.

Various bus units may execute commands on EIB 196. In the example depicted in FIG. 1, these bus units may include PPE 110, SPEs 120, 122, 124, 126, 128, 130, 132, 134, MIC 198, and BIC 197. PPE 110 is a primary processing element, and SPEs 120-234 are support processing elements. Even with the best intentions to design CBE 100 to avoid livelock conditions, two or more of these bus units may enter into a livelock condition. In accordance with an illustrative embodiment, livelock resolution unit 102, connected to EIB 196, and control processor 104 attempt to resolve livelock conditions. The bus units include watchdog timers (not shown) that track how long commands have stayed pending without completing. When a bus unit detects a timeout condition, or potential timeout condition, the bus unit sets a recoverable error status bit that indicates, through EIB 196 to a central fault isolation unit (not shown) in FIG. 1, the timeout condition. The bus unit also activates a livelock resolution request (LRR) signal to notify control processor 104 via a path through 102.

Control processor 104 may be, for example, an off-chip service processor that is used to service the system. For instance, control processor 104 may perform other system tasks, such as determining how fast a cooling fan runs and the like. One particular task that control processor 104 may perform is to monitor a temperature of the system and thermal throttle CBE 100, or more specifically PPE 110, to control power consumption and, thus, heat generation. Control processor 104 may manage particular status information in control register 106. For example, control processor 104 may set bits in control register 106 to indicate a thermal throttle mode, a bus mode, and so forth. In an alternative embodiment, control processor 104 may be on-chip within CBE 100.

In the illustrative embodiment, livelock resolution unit 102 monitors the livelock request signals from bus units. Responsive to one or more livelock request signals being activated, control processor 104 performs actions to attempt to resolve the livelock condition. For example, control controller 104 may thermal throttle PPE 110, quiesce SPEs 120-134, or signal EIB 196 to serialize bus commands.

Livelock resolution unit 102 calls attention to control processor 104 responsive to a livelock resolution request and communicates the actions of control processor 104 to EIB 196 and the bus units. Livelock resolution unit 102 may exist within pervasive logic in CBE 100.

Throttling is the ability of a processing element to change between stop (idle), and full speed modes, at very high frequency (hundreds of kilohertz). This switching looks to the system as a decrease in the working frequency of processing element, and leads to lower power consumption. In the depicted example, control processor 104 may thermal throttle PPE 110, the primary processing element.

To "quiesce" generally means to become temporarily inactive or disabled. In the context of this disclosure, to quiesce means to quiet the system by stopping the issuing of new commands. This prevents new commands from being sent to the bus and allows current commands to complete, if possible. In the depicted example, control processor 104 may quiesce SPEs 120-134, the support processing elements.

When the bus is in a serialized mode, or single-instruction mode, each bus command must complete its process from issue to snoop responses through combined snoop responses returned back to the initiating bus unit before a next bus command is allowed to proceed. Alternatively, a serialized bus mode may prevent subsequent bus commands from starting until any data transfers resulting from a current command have completed. In the depicted example, control processor 104 may set EIB 196 to operate in serialized mode.

Once a bus unit that issued a livelock resolution request has managed to successfully issue its command, it deactivates its livelock resolution request. If all livelock resolution request signals are deactivated, then control processor 104 instructs EIB 196 and all bus units to resume normal activity. On the other hand, if control processor 104 determines that a predetermined amount of time passes without any progress being made, it determines that a hang condition has occurred.

Figure 2A:
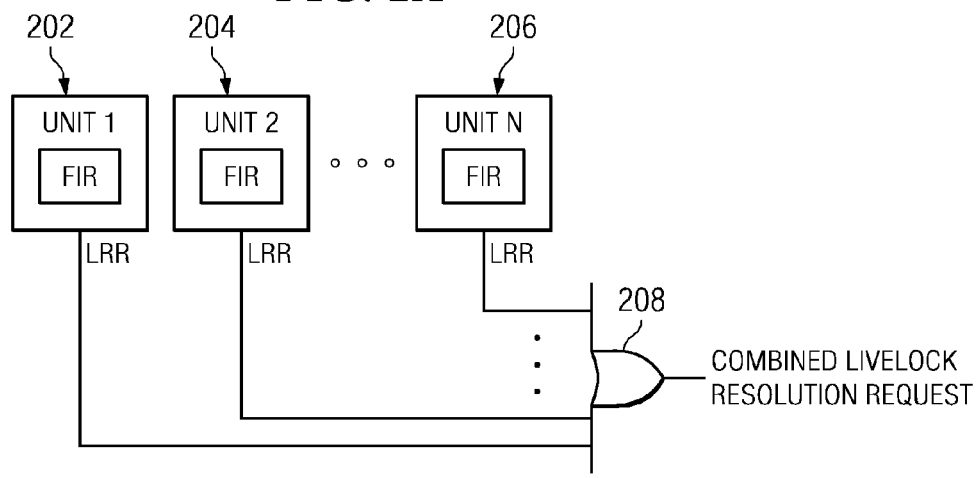
FIGS. 2A and 2B are diagrams that illustrate a livelock resolution unit in accordance with an exemplary embodiment.
Figure 2B:
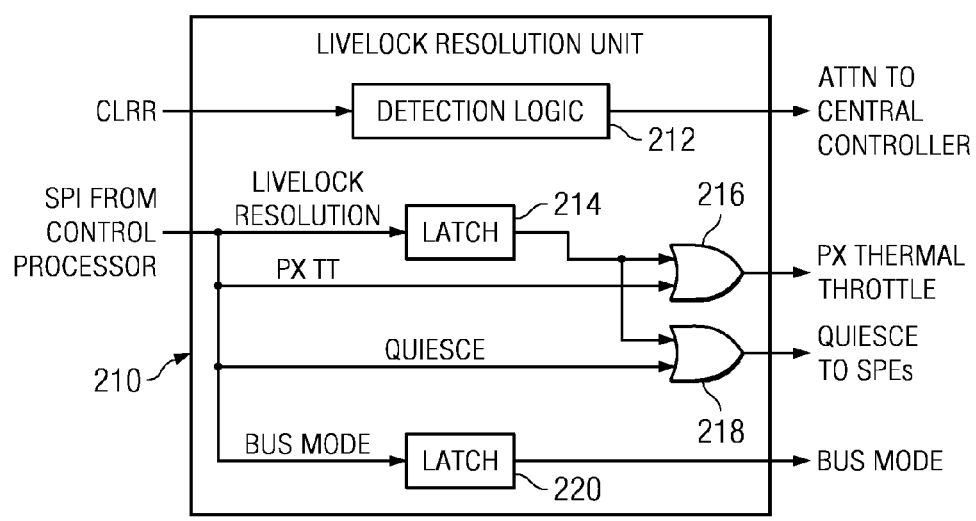

FIGS. 2A and 2B are diagrams that illustrate a livelock resolution unit in accordance with an exemplary embodiment. With reference to FIG. 2A, bus units 1-N 202, 204, 206 detect whether a watchdog timer has expired, or is about to expire. In one exemplary embodiment, bus units 202, 204, 206 may determine whether their EIB operation is some predetermined percentage, such as 50%, away from expiring. Thus, a "timeout condition," as used herein, may exist when the watchdog timer completely expires or is a predetermined percentage away from expiring.

As described above, bus units 1-N 202-206 may include PPE 110, SPEs 120, 122, 124, 126, 128, 130, 132, 134, MIC 198, and BIC 197 in FIG. 1. However, bus units 1-N 202-206 may be any combination of processors, memory control units, and peripheral control units (e.g., hard disk drive controllers, network interface cards, and the like).

When a given bus unit detects a timeout condition, it sets a bit in its fault isolation register (FIR) to indicate a recoverable error and then activates a livelock resolution request (LRR) signal. The LRR signal may be a separate signal carried through the bus or may be encoded within a snoop response signal or other existing signal. OR gate 208 combines the LRR signals from bus units 1-N 202-206 to form a combined livelock resolution request (CLRR) signal.

Turning to FIG. 2B, livelock resolution unit 210 receives the combined livelock resolution request signal at detection logic 212. In one exemplary embodiment, detection logic 212 may be a simple latch. However, in alternative embodiments, detection logic 212 may perform more advanced detection, such as determining whether the CLRR signal remains activated for a predetermined number of clock cycles. If detection logic 212 detects a livelock condition, an attention (ATTN) signal is sent to the control processor.

The control processor responds to the ATTN signal by setting status information to perform actions to attempt to correct the livelock condition. This status information is communicated back to livelock resolution unit 210 through service peripheral interface (SPI), which is a protocol used to communicate with the Cell Broadband Engine. A person of ordinary skill in the art will recognize that the aspects of the illustrative embodiments are not limited to the Cell Broadband Engine architecture or the service peripheral interface. The control processor may communicate with livelock resolution unit 210 using any protocol capable of communicating the actions necessary to attempt livelock resolution.

In the depicted example, the SPI information includes a livelock resolution signal, a processor element thermal throttle (PX TT) signal, a quiesce signal, and a bus mode signal. Latch 214 receives and stores the livelock resolution signal. OR gate 216 combines the output of latch 214 with the thermal throttle signal to generate a PX thermal throttle signal that is sent to the PPE. Therefore, livelock resolution unit 210 sends a PX thermal throttle signal to the PPE if the control processor engages PX thermal throttle or if the control processor engages livelock resolution.

OR gate 218 combines the output of latch 214 with the quiesce signal to generate a quiesce signal that is sent to the SPEs. Therefore, livelock resolution unit 210 sends a quiesce signal to the SPEs if the control processor engages quiesce to the SPEs explicitly or if the control processor engages livelock resolution.

Latch 220 receives and stores a bus mode signal from the control processor. The control processor may set the bus signal to a serialized or single-instruction mode during livelock resolution or may reset the bus mode to normal activity if no livelock resolution request signal is activated. This bus mode signal is sent through livelock resolution unit 210 and stored in latch 220 for communication to the bus.

Figure 3:
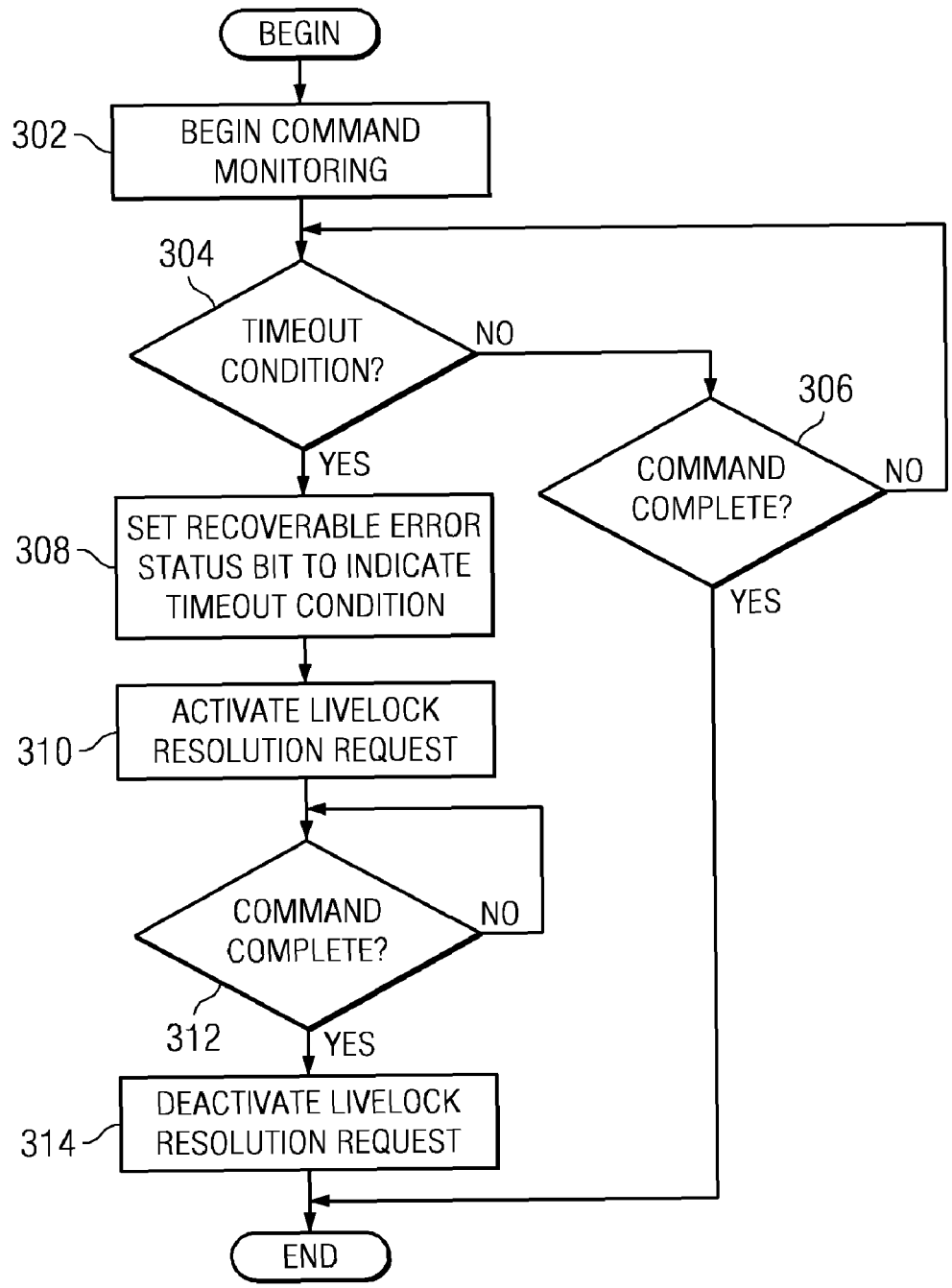
FIG. 3 is a flowchart illustrating operation of a command monitoring component within a bus unit within a multiple processor data processing system with livelock resolution in accordance with an illustrative embodiment.

FIG. 3 is a flowchart illustrating operation of a command monitoring component within a bus unit within a multiple processor data processing system with livelock resolution in accordance with an illustrative embodiment. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

With particular reference to FIG. 3, operation begins and the bus unit begins command monitoring (block 302). The bus unit then determines whether a timeout condition occurs (block 304). As mentioned above, a timeout condition may exist, for example, if a watchdog timer completely expires or if the watchdog timer is a predetermined percentage of the way from expiring. If a timeout condition does not exist in block 304, the bus unit determines whether the command has completed (block 306). If the command has not completed, operation returns to block 304 to determine whether a timeout condition exists. If the command has completed in block 306, monitoring ends.

Returning to block 304, if a timeout condition exists, the bus unit sets a recoverable error status bit to indicate the timeout condition (block 308) and activates a livelock resolution request signal (block 310).

Thereafter, the bus unit determines whether the command has completed (block 312). If the command has not completed, operation returns and block 312 repeats until the command completes. If the command has completed in block 312, then the bus unit deactivates the livelock resolution request (block 314), and monitoring ends.

At any point during the operation of the flowchart illustrated in FIG. 3, the control processor may detect a livelock request from any of the bus units. Thus, in this instance if the bus unit is a SPE, the bus unit will not attempt to initiate another command, because the control processor will have activated a quiesce signal in response to the livelock resolution request signal. If the bus unit is a PPE, then the bus unit may be thermal throttled during operation of the flowchart.

At any point during the operation of the flowchart illustrated in FIG. 3, the control processor may determine that a hang condition exists as a result of a livelock request from any of the bus units. In this instance, the control processor may assert a checkstop. A checkstop causes all clocks to stop. The processing elements are then immobilized, which allows for a status dump and/or debug.

Figure 4:
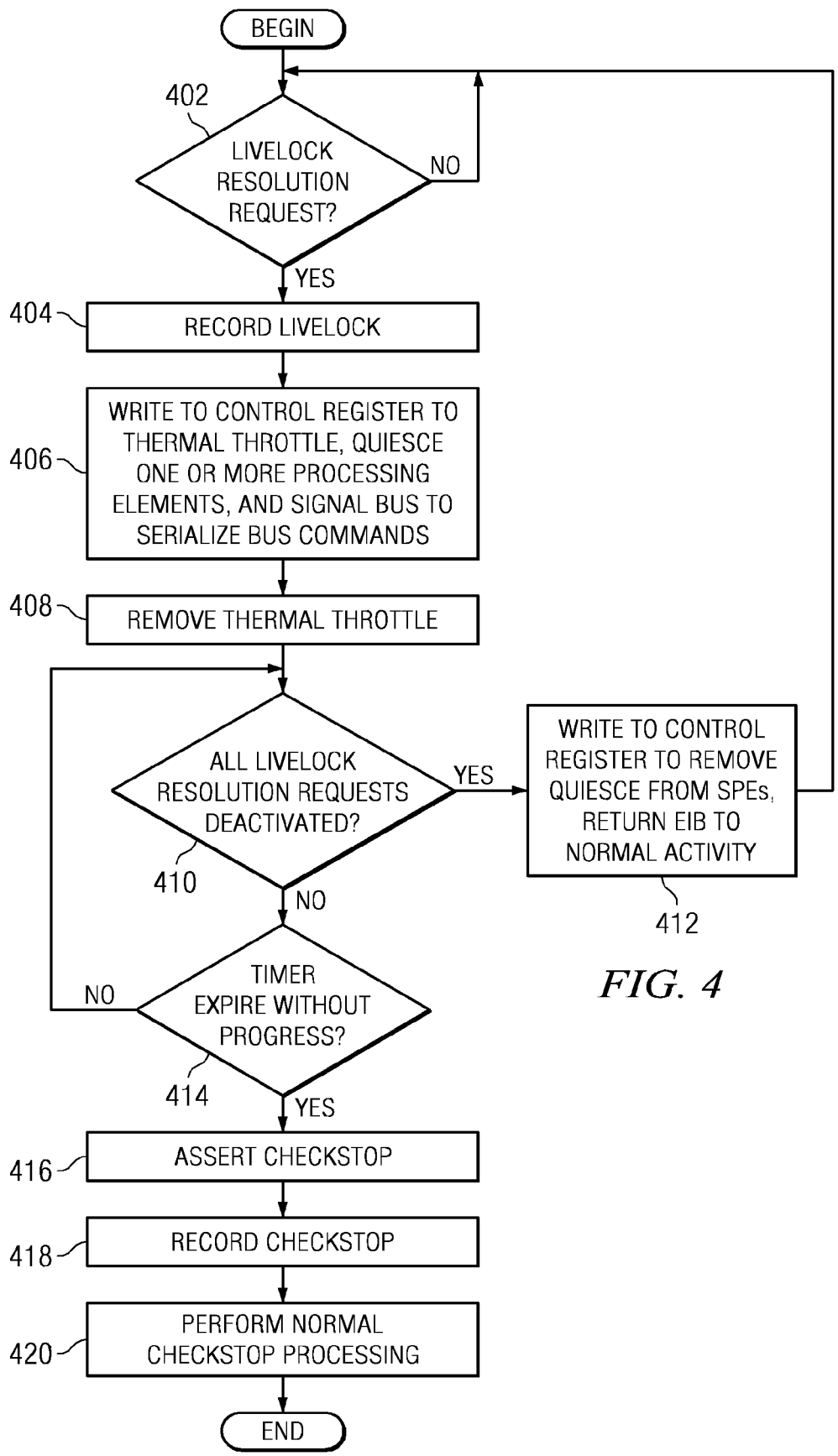
FIG. 4 is a flowchart illustrating operation of a control processor for livelock resolution in accordance with an illustrative embodiment.

FIG. 4 is a flowchart illustrating operation of a control processor for livelock resolution in accordance with an illustrative embodiment. Operation begins and the control processor determines whether a livelock resolution request signal is activated by one of the bus units (block 402). If a livelock resolution request signal is not activated, then block 402 repeats until a livelock resolution request signal is activated.

If a livelock resolution request signal is activated in block 402, the control processor records the livelock (block 404). Software may cause a significant number of livelocks, which may decrease the efficiency of the software. However, because livelocks do not cause the software to hang, the software developer may not be aware that livelocks are occurring. The control processor may record the livelock event in a persistent memory, such as a non-volatile random access memory (NVRAM) or the like, to allow for better debugging.

Next, the control processor writes to a control register to thermal throttle one or more processing elements, quiesce one or more processing elements, and signal the bus to serialize bus commands (block 406). Then, after a predetermined period of time, the control processor then removes the thermal throttle (block 408). Removing the thermal throttle prevents the multiple processor data processing system from staying in a livelock resolution mode, because thermal throttle prevents instructions from being dispatched, which artificially creates livelock detection.

Thereafter, the control processor determines whether all livelock resolution requests signals have been deactivated (block 410). If all livelock resolution request signals have been deactivated, the control processor writes to the control register to remove quiesce and returns the EIB to normal activity (block 412). Thereafter, operation returns to block 402 to determine whether a livelock resolution request subsequently becomes activated.

If all livelock resolution request signals have not been deactivated in block 410, the control processor determines whether a predetermined amount of time has expired without any progress being made on the outstanding commands (block 414). If the predetermined amount of time has not expired without progress being made, operation returns to block 410 to determine whether all livelock resolution request signals have been deactivated.

If the predetermined amount of time has expired without progress being made on the outstanding commands in block 414, the control processor asserts a checkstop to stop all clocks (block 416). The control processor then records the checkstop (block 418) to allow for better debugging. Then, the control processor performs normal checkstop processing (block 420), as known in the art, and operation ends.

Thus, the aspects of the illustrative embodiments solve the disadvantages of the prior art by providing a mechanism for resolving livelock conditions in a multiple processor data processing system. When a bus unit detects a timeout condition, or potential timeout condition, the bus unit activates a livelock resolution request signal. A livelock resolution unit receives livelock resolution requests from the bus units and signals an attention to a control processor. The control processor performs actions to attempt to resolve the livelock condition. For example, the control controller may thermal throttle one or more processing elements, quiesce one or more processing elements, or signal the bus to serialize bus commands.

Once a bus unit that issued a livelock resolution request has managed to successfully issue its command, it deactivates its livelock resolution request. If all livelock resolution request signals are deactivated, then the control processor instructs the bus and all bus units to resume normal activity. On the other hand, if the control processor determines that a predetermined amount of time passes without any progress being made, it determines that a hang condition has occurred.

The circuit as described above may be part of the design for an integrated circuit chip. The chip design may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design may then be converted into the appropriate format (e.g., GDSII) for the fabrication of photolithographic masks, which typically include multiple copies of the chip design in question that are to be formed on a wafer. The photolithographic masks may be utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip may be mounted in a single chip package (such as a plastic carrier, with leads that are affixed to a motherboard or other higher level carrier) or in a multichip package (such as a ceramic carrier that has either or both surface interconnections or buried interconnections). In any case, the chip may then be integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor. Moreover, the end products in which the integrated circuit chips may be provided may include game machines, game consoles, hand-held computing devices, personal digital assistants, communication devices, such as wireless telephones and the like, laptop computing devices, desktop computing devices, server computing devices, or any other computing device.

Figure 5:
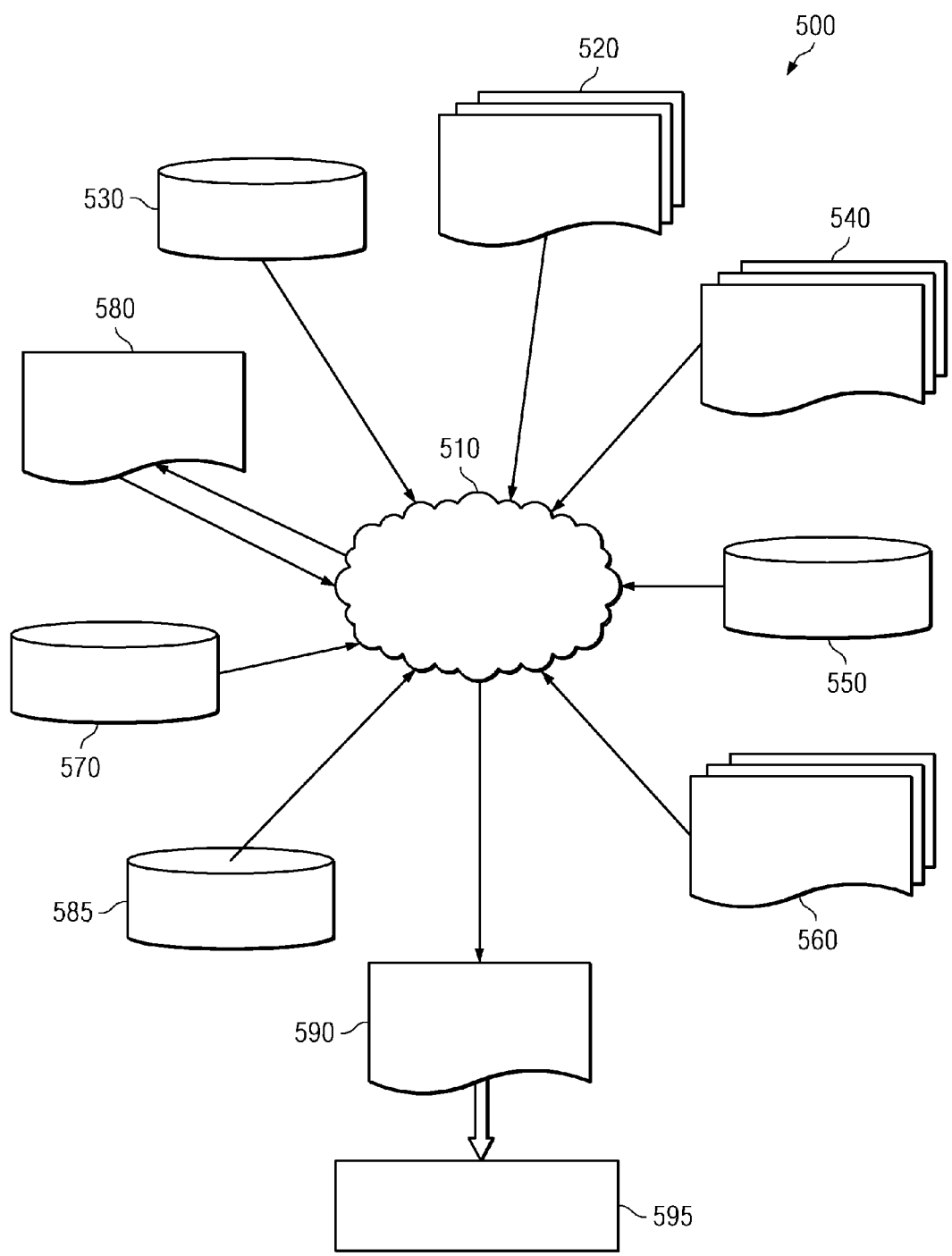
FIG. 5 is a flow diagram of a design process used in semiconductor design, manufacture, and/or test.

FIG. 5 shows a block diagram of an exemplary design flow 1300 used for example, in semiconductor IC logic design, simulation, test, layout, and manufacture. Design flow 500 includes processes and mechanisms for processing design structures to generate logically or otherwise functionally equivalent representations of the embodiments of the invention shown in FIGS. 2A-2B. The design structures processed and/or generated by design flow 500 may be encoded on machine-readable transmission or storage media to include data and/or instructions that when executed or otherwise processed on a data processing system generate a logically, structurally, or otherwise functionally equivalent representation of hardware components, circuits, devices, or systems.

FIG. 5 illustrates multiple such design structures including an input design structure 520 that is preferably processed by a design process 510. Design structure 520 may be a logical simulation design structure generated and processed by design process 510 to produce a logically equivalent functional representation of a hardware device. Design structure 520 may also or alternatively comprise data and/or program instructions that when processed by design process 510, generate a functional representation of the physical structure of a hardware device. Whether representing functional and/or structural design features, design structure 520 may be generated using electronic computer-aided design (ECAD) such as implemented by a core developer/designer. When encoded on a machine-readable data transmission or storage medium, design structure 520 may be accessed and processed by one or more hardware and/or software modules within design process 510 to simulate or otherwise functionally represent an electronic component, circuit, electronic or logic module, apparatus, device, or system such as those shown in FIGS. 2A-2B. As such, design structure 520 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 510 preferably employs and incorporates hardware and/or software modules for synthesizing, translating, or otherwise processing a design/simulation functional equivalent of the components, circuits, devices, or logic structures shown in FIGS. 2A-2B to generate a netlist 580 which may contain design structures such as design structure 520. Netlist 580 may comprise, for example, compiled or otherwise processed data structures representing a list of wires, discrete components, logic gates, control circuits, I/O devices, models, etc. that describes the connections to other elements and circuits in an integrated circuit design. Netlist 580 may be synthesized using an iterative process in which netlist 580 is resynthesized one or more times depending on design specifications and parameters for the device. As with other design structure types described herein, netlist 580 may be recorded on a machine-readable data storage medium. The medium may be a non-volatile storage medium such as a magnetic or optical disk drive, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 510 may include hardware and software modules for processing a variety of input data structure types including netlist 580. Such data structure types may reside, for example, within library elements 530 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 540, characterization data 550, verification data 560, design rules 570, and test data files 585 which may include input test patterns, output test results, and other testing information. Design process 510 may further include modules for performing standard circuit design processes such as timing analysis, verification, design rule checking, place and route operations, etc.

Design process 510 employs and incorporates well-known logic and physical design tools such as HDL compilers and simulation model build tools to process design structure 520 together with some or all of the depicted supporting data structures to generate a second design structure 590. Similar to design structure 520, design structure 590 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 2A-2B. In one embodiment, design structure 590 may comprise a compiled, executable HDL simulation model that functionally simulates the devices shown in FIGS. 2A-2B.

Design structure 590 may also employ a data format used for the exchange of layout data of integrated circuits and/or symbolic data format (e.g. information stored in a GDSII (GDS2), GL1, OASIS, map files, or any other suitable format for storing such design data structures). Design structure 590 may comprise information such as, for example, symbolic data, map files, test data files, design content files, manufacturing data, layout parameters, wires, levels of metal, vias, shapes, data for routing through the manufacturing line, and any other data processed by semiconductor manufacturing tools to fabricate embodiments of the invention as shown in FIGS. 2A-2B. Design structure 590 may then proceed to a stage 595 where, for example, design structure 590 proceeds to tape-out, is released to manufacturing, is released to a mask house, is sent to another design house, is sent back to the customer, etc.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A design structure embodied in a non-transitory machine readable medium for designing, manufacturing, or testing an integrated circuit, wherein the machine readable medium, when read by a computing device, causes the computing device to implement the design structure to generate a machine-executable representation of a Booth decoder circuit, the design structure comprising:

a design structure representing livelock resolution request logic that, responsive to a timeout condition in at least one of a plurality of bus units, generates a livelock resolution request signal;

a first design structure element representing detection logic that detects a livelock condition in response to the generation of the livelock resolution request signal, wherein the detection logic signals an attention to a control processor responsive to presence of a livelock condition, wherein responsive to the attention, the control processor sets status information to perform one ormore actions to attempt to correct a potential livelock condition, and wherein the status information comprises a livelock resolution signal;

a second design structure element representing activation logic that engages quiescing of at least a subset of a primary processing element and the plurality of support processing elements responsive to a livelock resolution signal from the control processor or a throttle signal from the control processor; and a third design structure element representing bus mode logic that engages a serialized bus mode at the bus responsive to the control processor setting the bus mode signal to a serialized mode.

2. The design structure of claim 1, wherein the design structure is configured such that quiescing at least a subset of the primary processing element and the plurality of support processing elements comprises throttling the at least one primary processing element.

3. The design structure of claim 1, wherein the design structure is configured such that the plurality of bus units comprise the at least one primary processing element, the plurality of support processing elements, and the bus, wherein the design structure representing livelock resolution request logic generates a livelock resolution request signal by:

generating, by at least one of the at least one primary processing element, the plurality of support processing elements, or the bus, a livelock resolution request signal.

4. The design structure of claim 1, wherein the design structure is configured such that the plurality of bus units comprise a memory control unit or a peripheral control unit, wherein the design structure representing livelock resolution request logic generates a livelock resolution request signal by:

generating, by a given one of the memory control unit or the peripheral control unit, a livelock resolution request signal.

5. The design structure of claim 1, wherein the design structure is configured such that each bus unit within the plurality of bus units has a watchdog timer, wherein the timeout condition exists when the watchdog timer expires, wherein the design structure representing livelock resolution request logic generates a livelock resolution request signal by:
generating, by a given bus unit within the plurality of bus units, a livelock resolution request signal responsive to expiration of its watchdog timer.

6. The design structure of claim 1, wherein the design structure is configured such that each bus unit within the plurality of bus units has a watchdog timer and wherein the timeout condition exists when the watchdog timer is a percentage away from expiring, wherein the design structure representing livelock resolution request logic generates a livelock resolution request signal by:
generating, by a given bus unit within the plurality of bus units, a livelock resolution request signal responsive to its watchdog timer being a non-zero percentage away from expiring.

7. The design structure of claim 1, wherein the design structure comprises a netlist.

8. The design structure of claim 1, wherein the design structure resides on storage medium as a data format used for the exchange of layout data of integrated circuits.

9. A design structure encoded on a machine-readable data storage medium, said design structure comprising elements that, when processed in a computer-aided design system, comprising rising at least one computing device, generates a machine-executable representation of a Booth decoder circuit, wherein said design structure comprises:
a design structure representing livelock resolution request logic that, responsive to a timeout condition in at least one of a plurality of bus units, generates a livelock resolution request signal;
a first design structure element representing detection logic that detects a livelock condition in response to generation of the livelock resolution request signal, wherein the detection logic signals an attention to a control processor responsive to presence of a livelock condition, wherein responsive to the attention, the control processor sets status information to perform one or more actions to attempt to correct a potential livelock condition, and wherein the status information comprises a livelock resolution signal;
a second design structure element representing activation logic that engages quiescing of at least a subset of a primary processing element and the plurality of support processing elements responsive to a livelock resolution signal from the control processor or a throttle signal from the control processor; and
a third design structure element representing bus mode logic that engages a serialized bus mode at the bus responsive to the control processor setting the bus mode signal to a serialized mode.

10. The design structure of claim 9, wherein the design structure is configured such that quiescing at least a'subset of the primary processing element and the plurality of support processing elements comprises throttling the at least one primary processing element.

11. The design structure of claim 9, wherein the design structure is configured such that the plurality of bus units comprise the at least one primary processing element, the plurality of support processing elements, and the bus, wherein the design structure representing livelock resolution request logic generates a livelock resolution request signal by:
generating, by at least one of the at least one primary processing element, the plurality of support processing elements, or the bus, a livelock resolution request signal.

12. The design structure of claim 9, wherein the design structure is configured such that the plurality of bus units comprise a memory control unit or a peripheral control unit, wherein the design structure representing livelock resolution request logic generates a livelock resolution request signal by:
generating, by a given one of the memory control, unit or the peripheral control unit, a livelock resolution request signal.

13. The design structure of claim 9, wherein the design structure is configured such that each bus unit within the plurality of bus units has a watchdog timer, wherein the timeout condition exists when the watchdog timer expires, wherein the design structure representing livelock resolution request logic generates a livelock resolution request signal by:
generating, by a given bus unit within the plurality of bus units, a livelock, resolution request signal responsive to expiration of its watchdog tinier.

14. The design structure of claim 9, wherein the design structure is configured such that each bus unit within the plurality of bus units has a watchdog timer and wherein the timeout condition exists when the watchdog timer is a percentage away from expiring, wherein the design structure representing livelock resolution request logic generates a livelock resolution request signal by:
generating, by a given bus unit within the plurality of bus units, a livelock resolution request signal responsive to its watchdog timer being a non-zero percentage away from expiring.

15. The design structure of claim 9, wherein the design structure comprises a netlist.

16. The design structure of claim 9, wherein the design structure resides on storage medium as a data format used for the exchange of layout data of integrated circuits.

17. A hardware description language (HDL) design structure encoded on a non-transitory machine-readable data storage medium, said HDL design structure comprising elements that when processed in a computer-aided design system comprising at least one computing device, generates a machine-executable representation of a Booth decoder circuit, wherein said HDL design structure comprises:
a design structure representing livelock resolution request logic that, responsive to a timeout condition in at least one of a plurality of bus units, generates a livelock resolution request signal;
a first design structure element representing detection logic that detects a livelock condition in response to generation of the livelock, resolution request signal, wherein the detection logic signals an attention to a control processor responsive to presence of a livelock condition, wherein responsive to the attention, the control processor sets status information to perform one or more actions to attempt to correct a potential livelock condition, and wherein the status information comprises a livelock resolution signal;
a second design structure element representing activation logic that engages quiescing of at least a subset of a primary processing element and the plurality of support processing elements responsive to a livelock resolution signal from the control processor or a throttle signal from the control processor; and
a third design structure element representing bus mode logic that engages a serialized bus mode at the bus responsive to the control processor setting the bus mode signal to a serialized mode.

18. A method in a computer-aided design system, comprising at least one hardware implemented processor, for generating a functional design model of a duty cycle correction circuit, said method comprising:

generating by the computer-aided design system, a functional computer-simulated representation of livelock resolution request logic that, responsive to a timeout condition in at least one of a plurality of bus units, generates a livelock resolution request signal;

generating, by the computer-aided design system, a functional computer-simulated representation of detection logic that detects a livelock condition in response to generation of the livelock resolution request signal, wherein the detection logic signals an attention to a control processor responsive to presence of a livelock condition, wherein responsive to the attention, the control processor sets status information to perform one or more actions to attempt to correct a potential livelock condition, and wherein the status information comprises a livelock resolution signal;

generating, by the computer-aided design system, a functional computer-simulated representation of activation logic that engages quiescing of at least a subset of a primary processing element and the plurality of support processing elements responsive to a livelock resolution signal from the control processor or a throttle signal from the control processor; and generating a functional computer-simulated representing bus mode logic that engages a serialized bus mode at the bus responsive to the control processor setting the bus mode signal to a serialized mode.

* * * * *